United States Patent
Lee et al.

(10) Patent No.: US 12,086,278 B2
(45) Date of Patent: Sep. 10, 2024

(54) METHOD OF ENCODING AND DECODING MEMORY DATA FOR SOFTWARE SECURITY, RECORDING MEDIUM AND APPARATUS FOR PERFORMING THE METHOD

(71) Applicant: Korea University Research and Business Foundation, Seoul (KR)

(72) Inventors: Gyungho Lee, Namyangju-si (KR); Yong-Suk Lee, Gunpo-si (KR)

(73) Assignee: Korea University Research and Business Foundation, Seoul (KR)

( * ) Notice: Subject to any disclaimer, the term of this patent is extended or adjusted under 35 U.S.C. 154(b) by 633 days.

(21) Appl. No.: 16/829,109

(22) Filed: Mar. 25, 2020

(65) Prior Publication Data
US 2020/0380150 A1 Dec. 3, 2020

(30) Foreign Application Priority Data
May 27, 2019 (KR) .................. 10-2019-0061810

(51) Int. Cl.
*G06F 21/62* (2013.01)
*G06F 12/14* (2006.01)

(52) U.S. Cl.
CPC .......... *G06F 21/6218* (2013.01); *G06F 12/14* (2013.01); *G06F 2212/1052* (2013.01)

(58) Field of Classification Search
CPC ................. G06F 21/6218; G06F 12/14; G06F 2212/1052
See application file for complete search history.

(56) References Cited

U.S. PATENT DOCUMENTS

| | | | |
|---|---|---|---|
| 2016/0335201 A1* | 11/2016 | Lea | G06F 21/71 |
| 2017/0214523 A1* | 7/2017 | Pebay-Peyroula | H04L 9/06 |
| 2020/0089919 A1* | 3/2020 | Courousse | G06F 21/755 |
| 2020/0125770 A1* | 4/2020 | LeMay | H04L 9/3242 |
| 2020/0143043 A1* | 5/2020 | Hong | G06F 21/566 |

FOREIGN PATENT DOCUMENTS

| | | |
|---|---|---|
| JP | 10-320291 A | 12/1998 |
| JP | 2006-23957 A | 1/2006 |
| JP | 2007-94728 A | 4/2007 |
| KR | 10-1173761 B1 | 8/2012 |
| KR | 10-2015-0119004 A | 10/2015 |

OTHER PUBLICATIONS

Wikipedia entry for "Indirect branch", archived by the Internet Archive on Dec. 29, 2016, retrieved from "https://web.archive.org/web/20161229040538/https://en.wikipedia.org/wiki/Indirect_branch" on Feb. 21, 2023, 1 Page.*
Korean Office Action issued on Sep. 18, 2020 in counterpart Korean Patent Application No. 10-2019-0061810 (4 pages in Korean).

* cited by examiner

*Primary Examiner* — Matthew T Henning
(74) *Attorney, Agent, or Firm* — NSIP Law

(57) ABSTRACT

A method of encoding and decoding memory data for software security, includes: encoding the memory data using a machine language into which an encoding function is injected and storing the encoded memory data in the memory area; and decoding the encoded memory data in the memory area using a machine language into which a decoding function is injected and branching the decoded memory data to an address designated by a value of the memory data.

14 Claims, 10 Drawing Sheets

FIG. 2

| ORIGINAL CODE | CHANGED CODE |
|---|---|
| setjmp | |
| mov %ecx, 20(%eax); | emov %ecx, 20(%eax); |
| | //store %ecx with encode to 20(%eax) |
| ... | |
| longjmp | |
| ... | |
| mov 20(%edx), %ecx; | //copy pointer of 20(%edx) to %ecx |
| jmp *%ecx; | //decode pointing %ecx data and jump |

FIG. 3

| ORIGINAL CODE | CHANGED CODE |
|---|---|
| mov $func1, 12(%esp); | emov $func1, 12(%esp); //store address of $func1 with encode to 12(%esp) |
| ... mov 12(%esp), %eax; call *%eax; | //copy pointer of 12(%esp) to %eax //call pointing of %eax data with decode and store return address with encode |

METHOD OF ENCODING AND DECODING MEMORY DATA FOR SOFTWARE SECURITY, RECORDING MEDIUM AND APPARATUS FOR PERFORMING THE METHOD

CROSS-REFERENCE TO RELATED APPLICATION

This application claims priority to Korean Patent Application No. 10-2019-0061810, filed on May 27, 2019, and all the benefits accruing therefrom under 35 U.S.C. § 119, the contents of which in its entirety are herein incorporated by reference.

BACKGROUND

1. Field

The present disclosure relates to a method of encoding and decoding memory data for software security, and a recording medium and an apparatus for performing the method, and more particularly, to a method of encoding and decoding memory data for software security, which encodes and decodes memory data stored in a memory area of a computer system in a machine instruction step of a computer processor, and a recording medium and an apparatus for performing the method.

2. Description of the Related Art

Data may be changed by control flows generated when a program is execution in a computer processor or due to the weakness of memory data, and various software methods have been proposed to detect them.

However, the software methods remain at the high level of verification, such as system calls or procedure calls, and there is a semantic gap between the actual verification and the machine instruction executed in the machine instruction step of the computer processor.

To solve this problem, a control flow integrity (CFI) software protection method has been proposed. According to the CFI method, a control flow is collected by statically analyzing codes of the software program, an inherent ID is given to the beginning and the end of the control flow, and the inherent ID is checked whenever the control flow is performed in order to check whether the control flow is a correct control flow.

However, a limitation is found in the CFI method. Namely, since the inherent ID of each control flow is determined by simply grouping target addresses to avoid performance degradation, it is difficult to verify the integrity of the control flow.

In addition, since the verification step may be passed by another software or an attacker or values of variables used in the verification may be changed due to the weakness of the memory data, there is a problem that the software is not transparent.

SUMMARY

The present disclosure is directed to providing a method of encoding and decoding memory data, which may secure integrity of a control flow by encoding and decoding the control data simultaneously when the control flow is changed in a machine instruction step of a computer processor, and a recording medium and an apparatus for performing the method.

The technical subject of the present disclosure is not limited to the above, and other technical subjects not mentioned herein may be clearly understood by those skilled in the art from the following disclosure.

In one aspect, there is provided a method of encoding and decoding memory data for software security, which encodes and decodes memory data stored in a memory area for the software security by a computer processor that executes a software, the method comprising: encoding the memory data using a machine language into which an encoding function is injected and storing the encoded memory data in the memory area; and decoding the encoded memory data in the memory area using a machine language into which a decoding function is injected and branching the decoded memory data to an address designated by a value of the memory data.

Meanwhile, the step of encoding the memory data and storing in the memory area may include: encoding the memory data using a value ($T_d$) of the memory data and an address ($T_a$) of the memory area in which the memory data is stored.

In addition, the step of encoding the memory data and storing in the memory area may include: generating an encryption key for each of a value ($T_d$) of the memory data and an address ($T_a$) of the memory area in which the memory data is stored by using a mapping table in which each value of the memory data and each address of the memory area in which the memory data is stored are respectively mapped with a random number and stored.

In addition, the step of encoding the memory data by using the value ($T_d$) of the memory data and the address ($T_a$) of the memory area in which the memory data is stored may include: encoding the memory data through an exclusive OR operation between the encryption key of the value ($T_d$) of the memory data and the encryption key of the address ($T_a$) of the memory area in which the memory data is stored.

In addition, the step of encoding the memory data and storing in the memory area may include: obtaining a result of the exclusive OR operation between the encryption key of the value ($T_d$) of the memory data and the encryption key of the address ($T_a$) of the memory area in which the memory data is stored as an inherent ID for the memory data; and storing the inherent ID in the address ($T_a$) of the memory area in which the memory data is stored.

In addition, the step of decoding the encoded memory data in the memory area and branching to an address designated by a value of the memory data may include: generating a decryption key of the address ($T_a$) of the memory area in which the memory data is stored by using a mapping table in which each address of the memory area in which the memory data is stored is mapped with a random number and stored; obtaining an encryption key of the value ($T_d$) of the memory data through an exclusive OR operation between the decryption key of the address ($T_a$) of the memory area in which the memory data is stored and the encoded memory data; and obtaining the value ($T_d$) of the memory data by decoding the encryption key of the value ($T_d$) of the memory data.

In addition, the step of obtaining the value ($T_d$) of the memory data by decoding the encryption key of the value ($T_a$) of the memory data may include: decoding the encryption key of the value ($T_d$) of the memory data by using a reverse mapping table of the mapping table in which each value of the memory data is mapped with a random number and stored.

In addition, the step of decoding the encoded memory data in the memory area and branching to an address designated by a value of the memory data may be an indirect branch instruction step among machine instruction steps of the computer processor.

In addition, there is also provided a computer-readable recording medium in which a computer program for executing the method of encoding and decoding memory data is recorded.

Meanwhile, there is also provided an apparatus of encoding and decoding memory data for software security, which is included in a computer processor for executing a software to encode and decode memory data stored in a memory area for the software security, the apparatus comprising: an encoding unit configured to encode the memory data using a machine language into which an encoding function is injected and store the encoded memory data in the memory area; and a decoding unit configured to decode the encoded memory data in the memory area using a machine language into which a decoding function is injected and branch the decoded memory data to an address designated by a value of the memory data.

Meanwhile, the apparatus may further comprise a mapping table that includes a mapping table in which a value of the memory data is mapped with a random number and stored, a mapping table in which an address of the memory area in which the memory data is stored is mapped with a random number and stored, and a reverse mapping table of the mapping table in which a value of the memory data is mapped with a random number and stored.

In addition, the encoding unit may include: an encryption key generating unit configured to generate an encryption key for each of a value ($T_d$) of the memory data and an address ($T_a$) of the memory area in which the memory data is stored by using the mapping table; an encoding calculation unit configured to encode the memory data through an exclusive OR operation between the encryption key of the value ($T_d$) of the memory data and the encryption key of the address ($T_a$) of the memory area in which the memory data is stored; and a storage unit configured to obtain a result of the exclusive OR operation between the encryption key of the value ($T_d$) of the memory data and the encryption key of the address ($T_a$) of the memory area in which the memory data is stored as an inherent ID for the memory data and store the inherent ID in the address ($T_a$) of the memory area in which the memory data is stored.

In addition, the decoding unit may include: a decryption key generating unit configured to generate a decryption key of the address ($T_a$) of the memory area in which the memory data is stored by using the mapping table; a decoding calculation unit configured to obtain the encryption key of the value ($T_d$) of the memory data through an exclusive OR operation between the decryption key of the address ($T_a$) of the memory area in which the memory data is stored and the encoded memory data and decode the encryption key of the value ($T_d$) of the memory data by using the mapping table; and a calling unit configured to change a control flow to the value ($T_a$) of the memory data.

In addition, the encoding unit may be executed by an instruction having a storing function and an encoding function of the memory data.

In addition, the decoding unit may be executed by an instruction that changes a control flow in an indirect branch instruction step of the computer processor.

According to the present disclosure, a computer system may be protected by verifying the integrity of a control flow in the machine instruction step of the processor. Further, the limitation of the semantic gap associated with a software data validation method executed at a high level like a system call or a procedure call may be overcome, and by using a software transparent method, it is possible to prevent another software or attackers from bypassing the verification step or changing variable values used for verification.

In addition, the encryption and decryption keys are generated using the mapping table and the encoding and decoding step is performed according to the XOR operation using the keys, which enables fast operation by a simple calculation method and thus prevents the performance degradation of the entire processor.

BRIEF DESCRIPTION OF THE DRAWINGS

FIGS. 2 and 3 are diagrams showing an example of a code that executes the apparatus for encoding and decoding memory data for software security according to an embodiment of the present disclosure.

DETAILED DESCRIPTION

Figure 1:
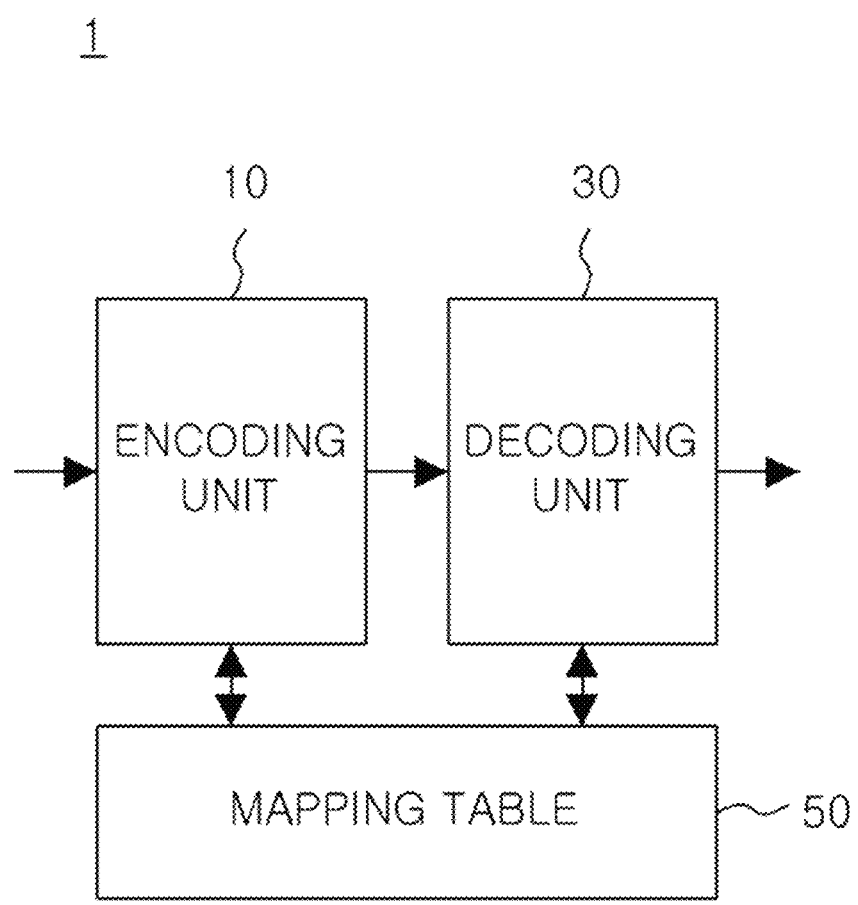
FIG. 1 is a block diagram showing an apparatus for encoding and decoding memory data for software security according to an embodiment of the present disclosure.

The present disclosure will be described in detail with reference to the accompanying drawings which illustrate, by way of example, specific embodiments in which the present disclosure may be implemented. These embodiments are described in sufficient detail to enable those skilled in the art to implement the present disclosure. It should be understood that various embodiments of the present disclosure are different from each other but need not be mutually exclusive. For example, specific features, structures and characteristics described herein may be implemented in other embodiments without departing from the scope of the present disclosure in connection with one embodiment. It should also be understood that the position or arrangement of individual components in each embodiment may be varied without departing from the scope of the present disclosure. Therefore, the following detailed description is not taken to limit the present disclosure, and the scope of the present disclosure is limited only by the appended claims, along with the full scope of equivalents to which such claims are entitled. In the drawings, like reference signs refer to the same or similar functions throughout several aspects.

Hereinafter, preferred embodiments of the present disclosure will be described in more detail with reference to the drawings.

FIG. 1 is a block diagram showing an apparatus for encoding and decoding memory data for software security according to an embodiment of the present disclosure.

Referring to FIG. 1, an apparatus 1 for encoding and decoding memory data for software security according to an embodiment of the present disclosure may include an encoding unit 10, a decoding unit 30 and a mapping table 50.

The apparatus 1 for encoding and decoding memory data for software security according to an embodiment of the present disclosure may be implemented components more or smaller than those depicted in FIG. 1.

The apparatus 1 for encoding and decoding memory data for software security according to an embodiment of the present disclosure is a device allowing data input and output, and a software (an application) for encoding and decoding memory data may be installed and executed at the apparatus. The encoding unit 10 and the decoding unit 30 depicted in FIG. 1 may be controlled by a software that is executed in the apparatus 1 for encoding and decoding memory data for software security according to an embodiment of the present disclosure.

The apparatus 1 for encoding and decoding memory data for software security according to an embodiment of the present disclosure may be included as a component of a computer processor. The computer processor is an integrated information processing system of a general computer and may include components such as a central processing unit (CPU), a storage device (a memory), and a hard disk. For example, the computer processor may load software-related data using the storage device to execute the software.

The apparatus 1 for encoding and decoding memory data for software security according to an embodiment of the present disclosure may be provided as a component of the computer processor to send and receive data through a system bus with components such as the central processing unit, the storage device and the hard disk.

The apparatus 1 for encoding and decoding memory data for software security according to an embodiment of the present disclosure may encode and decode memory data, which is data stored in the storage device as the software is executed in the computer processor.

The storage device of the computer processor refers to a memory area of a computer such as a Stack, Heap or BBS, and the memory data refers to data stored in the memory area. Hereinafter, among the memory data, control data will be described as an example. However, the present disclosure is not limited thereto, and all kinds of data stored in the memory area may be applied. The control data corresponds to data used in an indirect branch instruction step, among the memory data.

The apparatus 1 for encoding and decoding memory data for software security according to an embodiment of the present disclosure may encode and decode control data in a machine language instruction step of the computer processor. The apparatus 1 for encoding and decoding memory data for software security according to an embodiment of the present disclosure may integrate the memory data encoding and decoding step into an existing machine language. For example, the apparatus 1 for encoding and decoding memory data for software security according to an embodiment of the present disclosure may include a data encoding step in a machine language that stores memory data. If the memory data is control data, the apparatus may include a data decoding step in a machine language that calls control data.

To this end, the apparatus 1 for encoding and decoding memory data for software security according to an embodiment of the present disclosure may be configured to execute or control the machine instruction step in the computer processor.

For example, the apparatus 1 for encoding and decoding memory data for software security according to an embodiment of the present disclosure may execute an indirect branch instruction step among the machine instruction steps of the computer processor. In the case of the indirect branch instruction, instructions such as call, ret and jmp are used. Since the control flow is changed by storing the control data in the memory area and loading the control data stored in the memory area to a program counter, it is required to verify the integrity of the control flow transition.

Meanwhile, in the direct branch instruction step, an instruction such as conditional branch or absolute jmp is used. Since the control data is branched to a predetermined address and executed, it is not necessary to verify the integrity of the control flow transition. Thus, the apparatus 1 for encoding and decoding memory data for software security according to an embodiment of the present disclosure may encode and decode control data only in the indirect branch instruction step.

For example, the encoding unit 10 may encode the control data when being stored in the memory area. The decoding unit 30 may decode the encoded control data stored in the memory area when being loaded to a program counter.

To this end, the encoding unit 10 may be executed by an instruction having a storing function and an encoding function for the control data. The decoding unit 30 may be executed by an instruction for changing the control flow in the indirect branch instruction step. This will be described with reference to FIGS. 2 and 3.

FIGS. 2 and 3 are diagrams showing an example of a code that executes the apparatus for encoding and decoding memory data for software security according to an embodiment of the present disclosure.

Referring to FIG. 2, control data (% ecx) may be stored in the memory area 20 (% eax) by a mov instruction. That is, the value of the control data corresponds to a target address to be branched by a jmp instruction of the indirect branch instruction step and may be defined as a value stored at a designated address of the memory area by the mov instruction.

The encoding unit 10 may be implemented to store the control data at a specified address in the memory area as described above and may be executed by an emov instruction instead of a mov instruction.

In this embodiment, the emov instruction may be defined as an instruction obtained by adding an encoding function of the control data to a function of the mov instruction. The encoding unit 10 may encode the control data by the emov instruction and store the encoded control data at a specified address in the memory area.

The control data (% ecx) may be called to the program counter by the jmp instruction of the indirect branch instruction step. That is, the indirect branch instruction step may change the control flow by reading the value of the control data from the memory area using the jmp instruction and branching the read value to a value of the corresponding control data.

The decoding unit 30 may execute the indirect branch instruction step of reading and branching the control data from a designated address of the memory area as described above, which may be executed by an instruction that proceeds with the indirect branch instruction step to which a decoding function is added.

In this embodiment, it will be described as an example that an instruction for performing the indirect branch instruction step is x86 or x64 call, ret or jmp of Intel.

The call instruction may have a function of decoding and branching the control data stored in the memory area by injecting a decoding function therein. In this case, the call instruction may decode and store control data corresponding to a return address at a specified address of the memory area (stack) (see FIG. 3).

The ret instruction may also have a function of decoding and branching the control data stored in the memory area by injecting a decoding function therein. In this case, the ret instruction may decode the return address stored in the memory area (stack) and call to the program counter by the call instruction.

The jmp instruction may also have a function of decoding and branching the control data stored in the memory area by injecting a decoding function therein.

As such, the decoding unit 30 may be executed to decode and branch the control data stored in the memory area by the instructions in which the decoding function is injected.

Meanwhile, the encoding unit 10 and the decoding unit 30 may generate a key used for encoding and decoding the control data with reference to the mapping table 50, respectively. The mapping table 50 may be configured based on the value of the control data and the address of the memory area in which the control data is stored. This will be described with reference to FIGS. 4 and 5.

Figure 4:
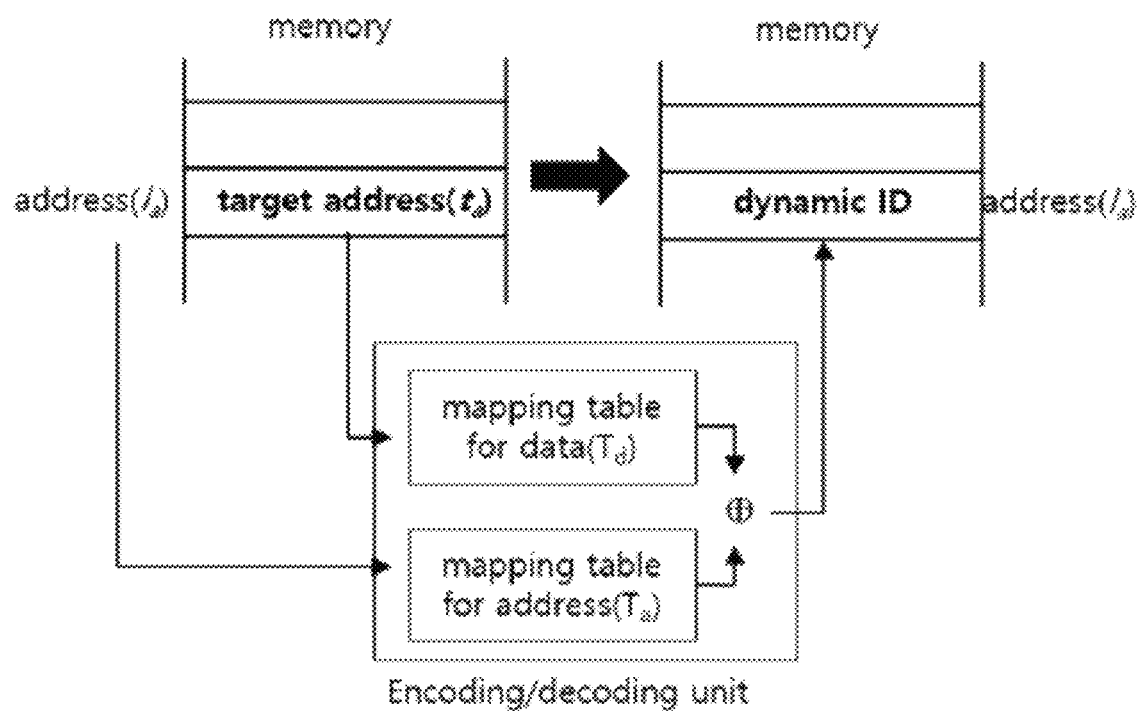
FIG. 4 is a conceptual view for schematically illustrating an operation in the encoding unit depicted in FIG. 1.
Figure 5:
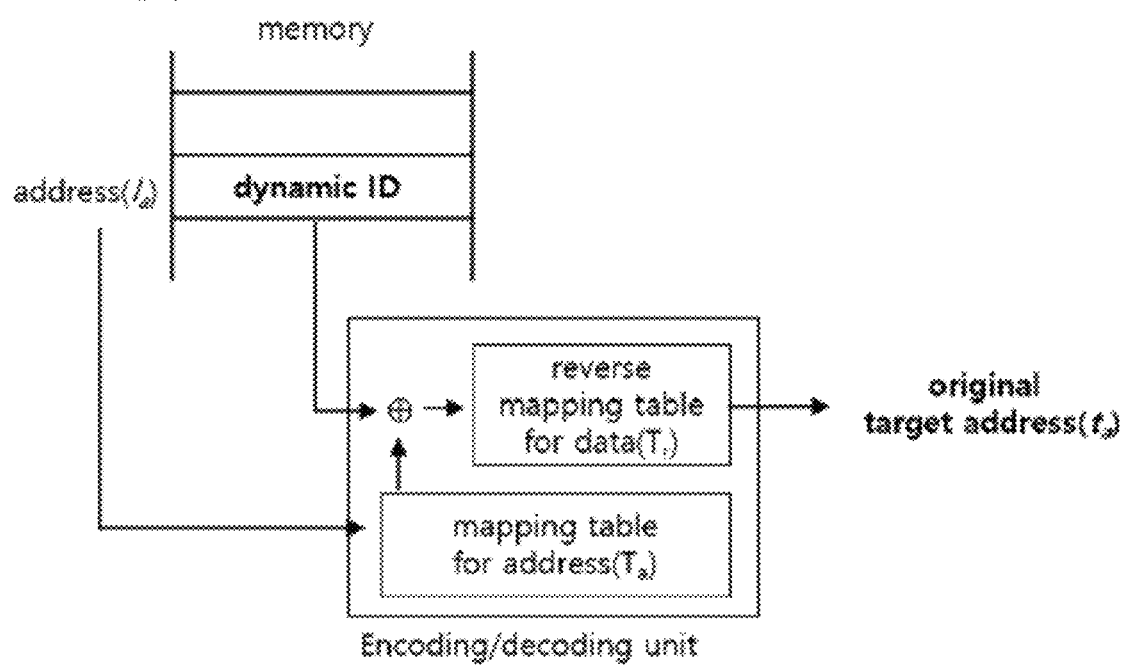
FIG. 5 is a conceptual view for schematically illustrating an operation in the decoding unit depicted in FIG. 1.

FIG. 4 is a conceptual view for schematically illustrating an operation in the encoding unit depicted in FIG. 1, and FIG. 5 is a conceptual view for schematically illustrating an operation in the decoding unit depicted in FIG. 1.

Referring to FIG. 4, the encoding unit 10 may encode the control data (target address ($t_a$)) and store at a specific address (/a) in the memory area. The encoding unit 10 may generate an encryption key of each of the address (/a) of the memory area in which the control data (target address ($t_a$)) is stored and the value (target address ($t_a$)) of the control data by using the mapping table 50, and encode the value (target address ($t_a$)) of the control data through an exclusive OR operation (hereinafter, XOR operation) between the generated encryption keys. The encoding unit 10 may store the value (target address ($t_a$)) of the encoded control data in the specific address (/a) of the memory area as an inherent ID (dynamic ID).

Referring to FIG. 5, the decoding unit 30 may call the control data from the specific address (/a) of the memory area and branch to a designated address using the value (target address ($t_a$)) of the control data. The decoding unit 30 may generate a decryption key of the specific address (/a) of the memory area by using the mapping table 50, obtain the value of the encoded control data through an XOR operation between the decryption key and the inherent ID (dynamic ID) stored in the corresponding address, and decode the value of the encoded control data by using the mapping table 50 to obtain the value (target address ($t_a$)) of the control data. The decoding unit 30 may call the control data to a program counter and branch to a designated address (target address ($t_a$)).

Meanwhile, in this embodiment, it has been described that the encoding unit 10 and the decoding unit 30 perform encoding and decoding with reference to the mapping table 50 as an example. However, the present disclosure is not limited thereto, and the control data may be encoded and decoded using various known encoding and decoding methods.

Hereinafter, each component of the apparatus 1 for encoding and decoding memory data for software security according to an embodiment of the present disclosure as shown in FIG. 1 will be described in detail.

Figure 6:
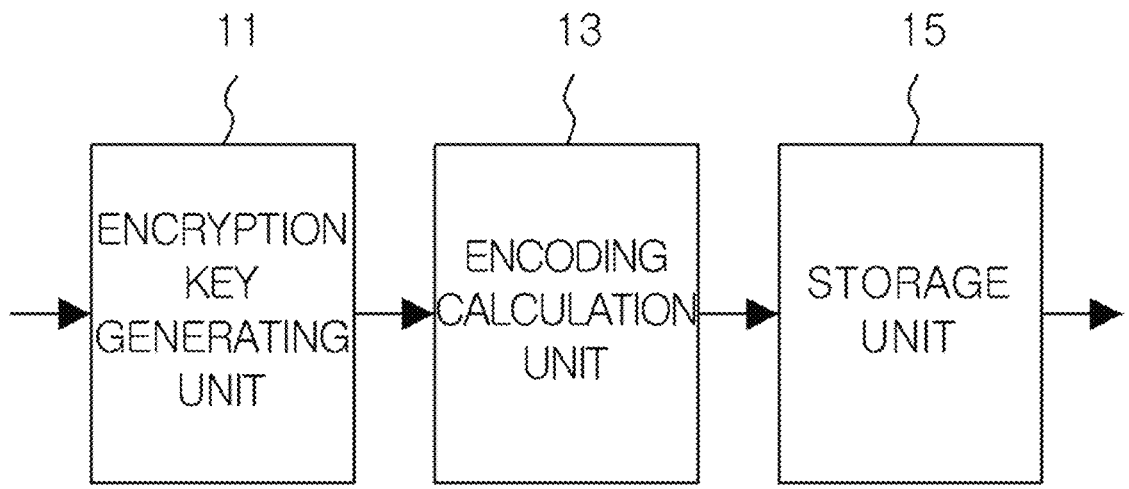
FIG. 6 is a detailed block diagram showing the encoding unit of FIG. 1.
Figure 7:
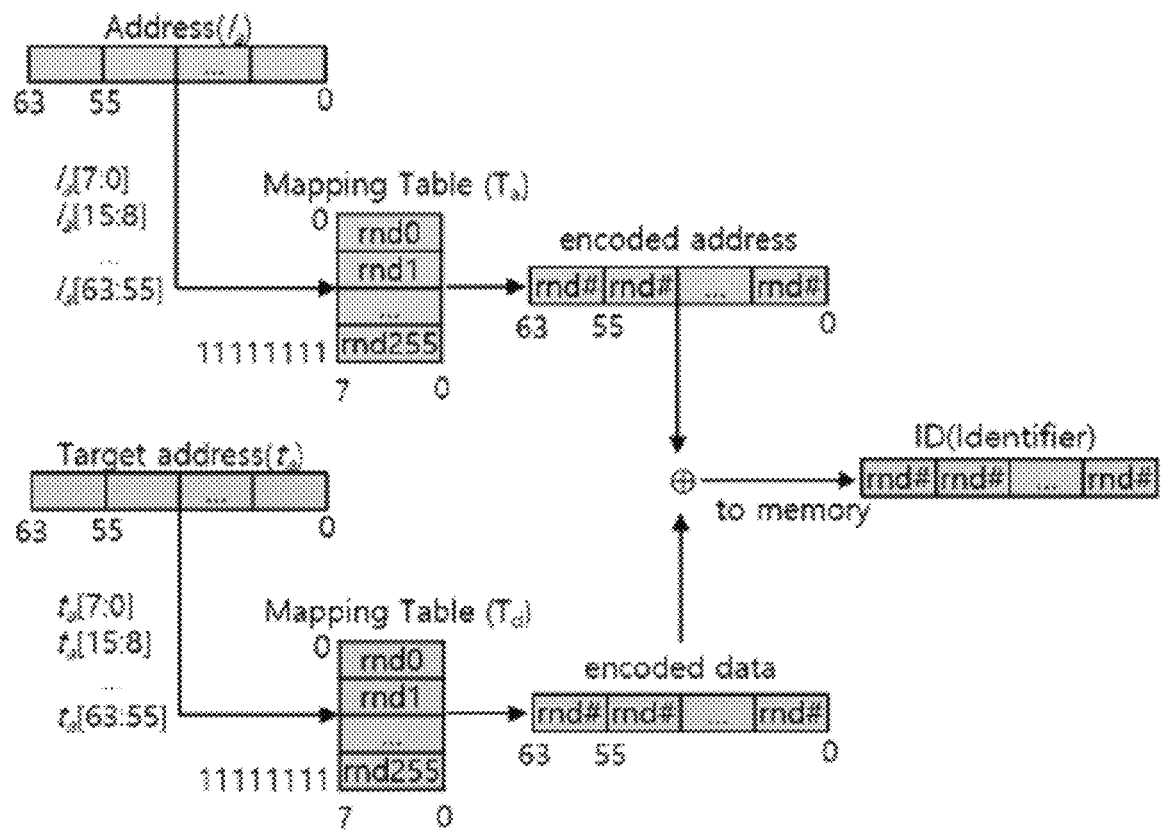
FIG. 7 is a diagram for illustrating a memory data encoding step by the encoding unit depicted in FIG. 1.

FIG. 6 is a detailed block diagram showing the encoding unit of FIG. 1, and FIG. 7 is a diagram for illustrating a memory data encoding step by the encoding unit depicted in FIG. 1.

Referring to FIG. 6, the encoding unit 10 may include an encryption key generating unit 11, an encoding calculation unit 13, and a storage unit 15.

The encryption key generating unit 11 may generate an encryption key for encoding the control data. The encryption key generating unit 11 may generate the encryption key based on the value ($T_d$) of the control data and the address ($T_a$) in which the control data is stored. Here, the value ($T_d$) of the control data corresponds to an address (a target address or a return address) to which the control data is branched, and the address ($T_a$) in which the control data is stored corresponds to the address of the memory area in which the control data is stored by the emov instruction.

The encryption key generating unit 11 may use the mapping table 50 in order to generate the encryption key based on the value ($T_d$) of the control data and the address ($T_a$) in which the control data is stored. The mapping table 50 is a table where each of the value ($T_d$) of the control data and the address ($T_a$) in which the control data is stored is mapped with a random number and stored. The encryption key generating unit 11 may generate an encryption key of each of the value ($T_d$) of the control data and the address ($T_a$) in which the control data is stored by using the mapping table 50. This will be described with reference to FIG. 7 based on an example where the computer processor has 64 bits.

Referring to FIG. 7, the mapping table 50 may include a mapping table ($T_d$) for the value ($T_d$) of the control data and a mapping table ($T_a$) for the address in which the control data is stored. The mapping table ($T_d$) for the value ($T_d$) of the control data may be a table in which a random number is mapped to every value ($T_d$) of the control data divided into 8 bits and stored, and the table ($T_d$) for the value ($T_d$) of the control data may be a table in which a random number is mapped with every address ($T_a$) of the memory area divided into 8 bits and stored. At this time, the mapping table 50 may set different random numbers mapped with different data.

The encryption key generating unit 11 may divide the address ($T_a$) in which the control data is stored by 8 bits, obtain the random number mapped with data represented by each region from the mapping table ($T_a$) for the address in which the control data is stored, and generate an encryption key of the address ($T_a$) in which the control data is stored by replacing each region with the random number.

In addition, the encryption key generating unit 11 may divide the value ($T_d$) of the control data by 8 bits, obtain the random number mapped with data represented by each region from the mapping table ($T_d$) for the value of the control data, and generate an encryption key of the value ($T_d$) of the control data by replacing each region with the random number.

The encoding calculation unit 13 may encode the value ($T_d$) of the control data by performing an XOR operation between the encryption key of the address ($T_a$) in which the control data is stored and the encryption key of the value ($T_d$) of the control data. The encoding calculation unit 13 may obtain a result of the XOR operation between the encryption key of the address ($T_a$) in which the control data is stored and the encryption key of the value ($T_d$) of the control data as an inherent ID for the control data.

Through the XOR operation as above, the encoding calculation unit 13 may make it difficult to infer the mapping table ($T_d$) for the value of the control data and enables quick calculation by a simple calculation method, thereby improving the performance of the entire processor.

The storage unit 15 may store the inherent ID in the memory area. The storage unit 15 may store the inherent ID in the address ($T_a$) designated in the memory area in advance so that the control data is stored. The inherent ID may become an inherent ID in the indirect branch instruction step.

Figure 8:
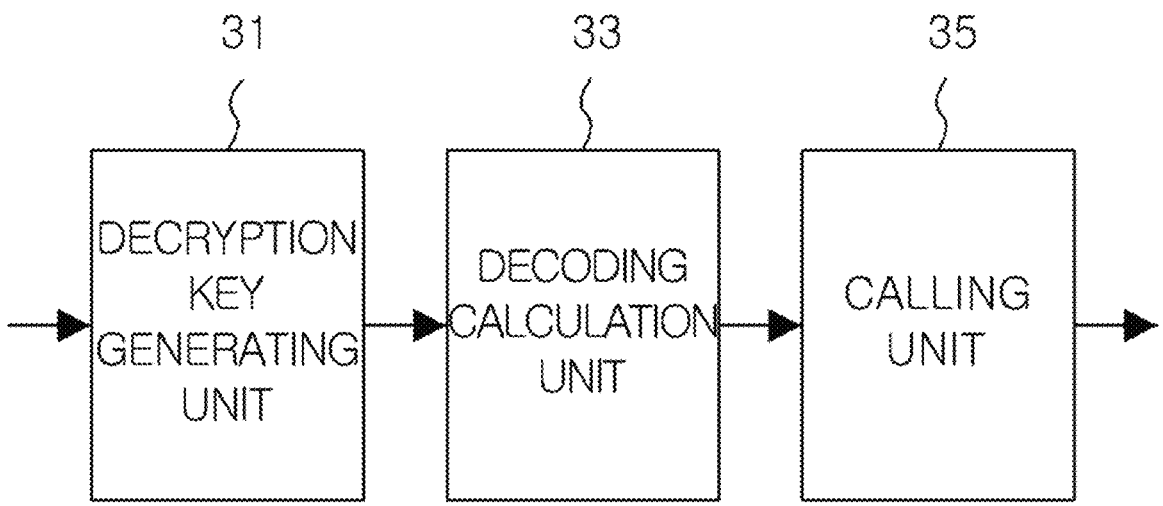
FIG. 8 is a detailed block diagram showing the decoding unit of FIG. 1.
Figure 9:
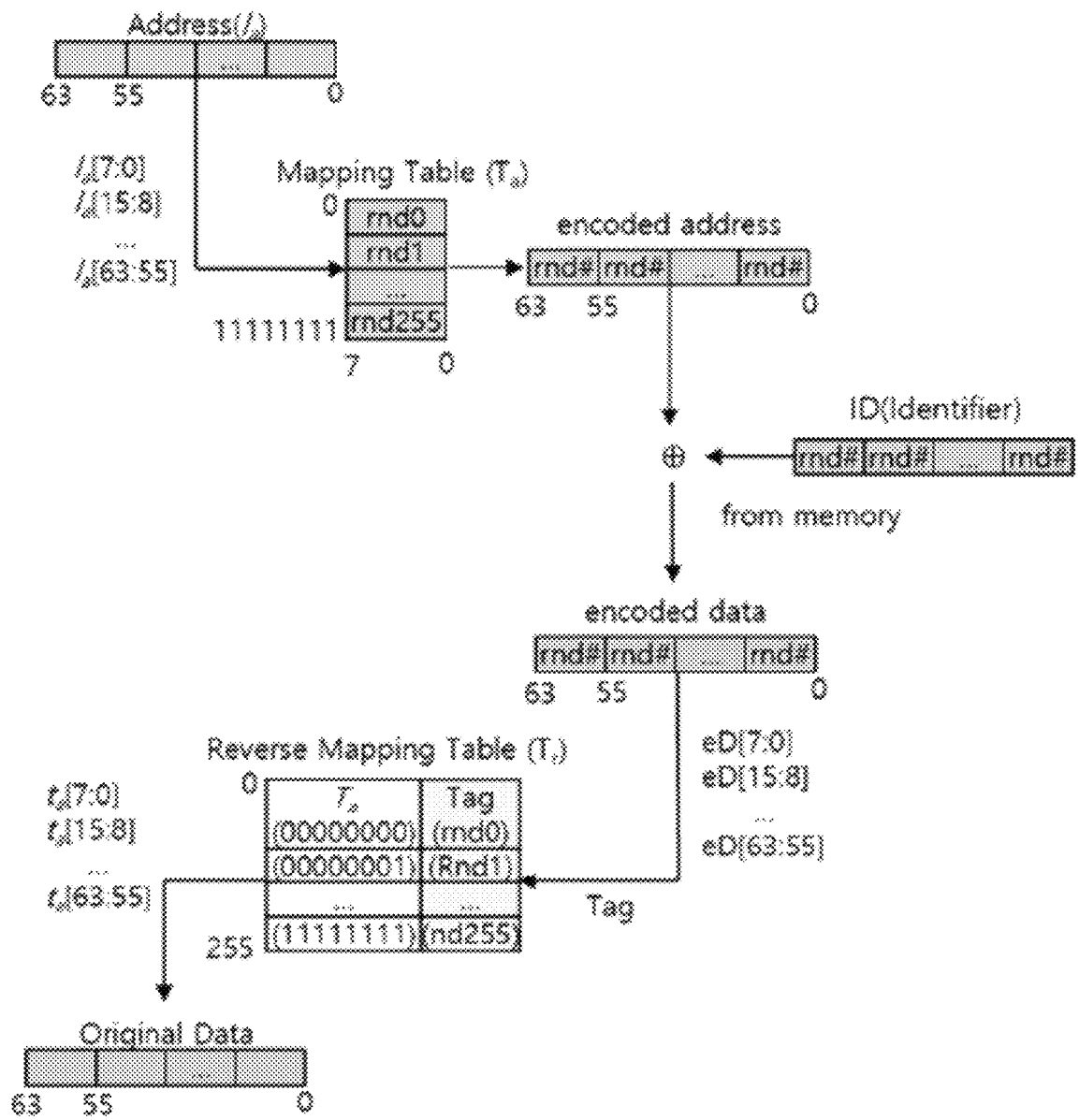
FIG. 9 is a diagram for illustrating a memory data decoding step by the decoding unit depicted in FIG. 1.

FIG. 8 is a detailed block diagram showing the decoding unit of FIG. 1, and FIG. 9 is a diagram for illustrating a memory data decoding step by the decoding unit depicted in FIG. 1.

Referring to FIG. 8, the decoding unit 30 may include a decryption key generating unit 31, a decoding calculation unit 33 and a calling unit 35.

The decryption key generating unit 31 may generate a decryption key for decoding the control data stored at a specific address in the memory area. In other words, the decryption key generating unit 31 may generate a decryption key for decoding the inherent ID of the indirect branch instruction step.

In this embodiment, the control data may be encoded and stored in the memory area as an inherent ID. That is, the encoded control data can be referred to as an inherent ID, and as described above, the encryption keys of the address ($T_a$) where the inherent ID is stored and the value ($T_d$) of the control data may be obtained by an XOR operation.

Firstly, the decryption key generating unit 31 may generate a decryption key of the address ($T_a$) in which the inherent ID is stored, namely the address ($T_a$) in which the control data is stored, by using the mapping table 50 in order to decode the inherent ID. This will be described with reference to FIG. 9 based on an example where the computer processor is 64 bits.

Referring to FIG. 9, the mapping table 50 may include the mapping table ($T_a$) for the address in which the control data is stored as described above. The mapping table ($T_a$) for the address in which the control data is stored may be a table in which a random number is mapped with each address ($T_a$) of the memory area divided into 8 bits and stored.

The decryption key generating unit 31 may divide the address ($T_a$) in which the control data is stored by 8 bits, obtain a random number mapped with data represented by each region from the mapping table ($T_a$) for the address in which the control data is stored, and generate a decryption key of the address ($T_a$) in which the control data is stored by replacing each region with the random number.

The decoding calculation unit 33 may obtain an encryption key of the value ($T_d$) of the control data by performing an XOR operation between the decryption key of the address ($T_a$) in which the control data is stored and the inherent ID stored at the corresponding address. The decoding calculation unit 33 may obtain a result of the XOR operation between the decryption key of the address ($T_a$) in which the control data is stored and the inherent ID stored at the corresponding address as an encryption key of the value ($T_d$) of the control data.

Also, the decoding calculation unit 33 may obtain the value ($T_d$) of the control data by decoding the encryption key of the value ($T_d$) of the control data. As described above, the encryption key of the value ($T_d$) of the control data may be generated by the mapping table ($T_d$) for the value ($T_d$) of the control data. Thus, the decoding calculation unit 33 may decode the encryption key of the value ($T_d$) of the control data using the mapping table 50.

Referring to FIG. 9, the mapping table 50 may further include a reverse mapping table ($T_r$) of the mapping table ($T_d$) for the value ($T_d$) of the control data. The reverse mapping table ($T_r$) is a table configured to obtain encoded data according to the mapping table ($T_d$) for the value ($T_d$) of the control data, and for example, may be a table in which the value ($T_d$) of the control data divided by 8 bits is mapped with each random number included in the mapping table ($T_d$) for the value ($T_d$) of the control data and stored.

The decoding calculation unit 33 may divide the encryption key of the value ($T_d$) of the control data by 8 bits, obtain data mapped with the random number represented by each region from the reverse mapping table ($T_r$), and obtain the value ($T_d$) of the control data by replacing each region with the data.

The calling unit 35 may change the control flow to the value ($T_d$) of the control data. The calling unit 35 may call the control data to a program counter and branch to the value ($T_d$) of the control data.

The apparatus 1 for encoding and decoding memory data for software security according to an embodiment of the present disclosure may encode and decode the control data together when the control flow is changed in the machine instruction step of the processor. That is, the apparatus 1 for encoding and decoding memory data for software security according to an embodiment of the present disclosure may protect the computer system by verifying the integrity of the control flow in the machine instruction step of the processor, and furthermore may prevent that another software or an attacker bypasses the verification step or change a variable value used for the verification using a software transparent method, while overcoming the limitations of the semantic gap associated with a software data validation method executed at a high level like a system call or a procedure call.

Moreover, since the apparatus 1 for encoding and decoding memory data for software security according to an embodiment of the present disclosure generates encryption and decryption keys using the mapping table and performs the encoding and decoding step according to the XOR operation using the keys, it enables fast operation by a simple calculation method and thus prevents the performance degradation of the entire processor.

Hereinafter, a method of encoding and decoding memory data for software security according to an embodiment of the present disclosure will be described.

The method of encoding and decoding memory data for software security according to an embodiment of the present disclosure may be performed under substantially the same configuration as the apparatus 1 for encoding and decoding memory data for software security according to an embodiment of the present disclosure as shown in FIG. 1. Thus, the same components as in the apparatus 1 of FIG. 1 are designated by the same reference signs and will not be described in detail.

Figure 10:
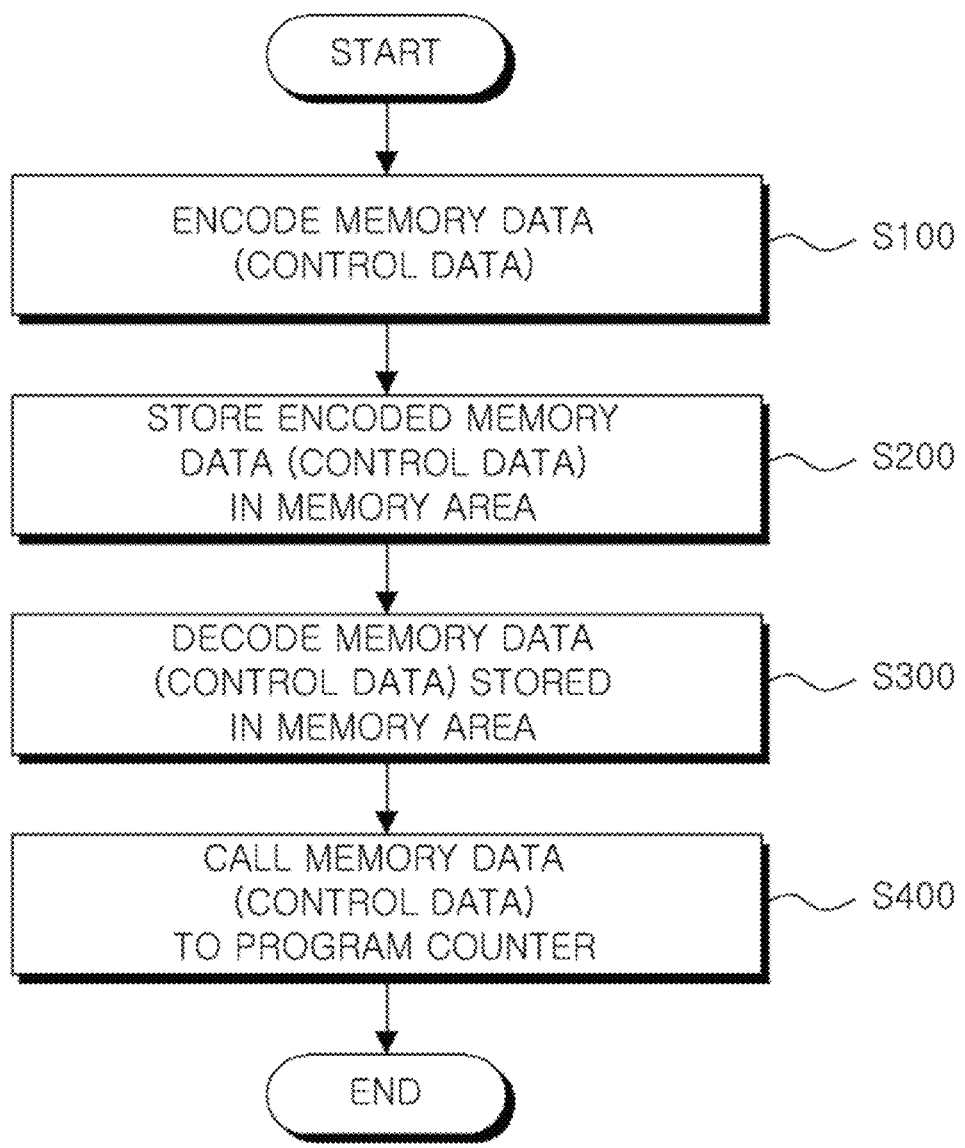
FIG. 10 is a flowchart for illustrating a method of encoding and decoding memory data for software security according to an embodiment of the present disclosure.

FIG. 10 is a flowchart for illustrating a method of encoding and decoding memory data for software security according to an embodiment of the present disclosure.

Referring to FIG. 10, the encoding unit 10 may encode control data (S100) and store the encoded control data in a memory area (S200).

The encoding unit 10 may encode and store the control data at a specific address in the memory area. The encoding unit 10 may generate an encryption key for each of the address of the control area and the value of the control data where the control data is stored using the mapping table 50, and encode the value of the control data through an XOR operation between the generated encryption keys. The encoding unit 10 may store the value of the encoded control data as an inherent ID at a specific address in the memory area.

Meanwhile, although it has been described that the encoding unit 10 encodes and stores control data as an example, the present disclosure is not limited thereto, and any type of memory data stored in a memory area of a processor may be applied in addition to the control data.

The decoding unit 30 may decode the control data stored in the memory area (S300) and call the decoded control data to a program counter (S400).

The decoding unit 30 may call the control data from the specific address in the memory area and branch to an address designated by the value of the control data. The decoding unit 30 may generate a decryption key of the specific address in the memory area using the mapping table 50, obtain the value of the encoded control data through an XOR operation between the decryption key and the inherent ID stored in the address, and obtain the value of the control data by decoding the value of the encoded control data using the mapping table 50. The decoding unit 30 may call the control data to the program counter and branch to a designated address.

The method of encoding and decoding memory data for software security of the present disclosure may be implemented in the form of an application or program commands executable by various computer components and be recorded on a computer-readable recording medium. The computer-readable recording medium may include program commands, data files, data structures or the like solely or in combination.

The program commands recorded on the computer-readable recording medium may be specially designed or configured for the present disclosure or known to and available by computer software engineers.

The computer-readable recording medium includes, for example, magnetic media such as a hard disk, a floppy disk and a magnetic tape, optical media such as CD-ROM and DVD, magneto-optical media such as a floptical disk, hardware devices such as ROM, RAM and a flash memory, specially configured to store and perform program commands, or the like.

The program commands include not only machine codes made by a complier but also high-level language codes executable by a computer by using an interpreter. The hardware device may be configured to operate as at least one software module to perform the operations of the present disclosure, or vice versa.

While the present disclosure has been described with reference to the embodiments, it will be understood by those skilled in the art that various changes and modifications can be made without departing from the scope of the present disclosure as set forth in the appended claims.

REFERENCE SIGNS

1: apparatus for encoding and decoding memory data for software security
10: encoding unit
30: decoding unit
50: mapping table

What is claimed is:

1. A method of encoding and decoding memory data for software security, which encodes and decodes memory data stored in a memory area for the software security by a computer processor that executes a software, the method comprising:

encoding, based on a target address of a memory area in which control data is stored by an emov instruction, the memory data using a machine language into which an encoding function is injected and storing the encoded memory data in the memory area; and decoding, only in an indirect branch instruction step, the encoded memory data in the memory area using a machine language into which a decoding function is injected and branching the decoded memory data to an address designated by a value of the memory data, wherein the target address is a predetermined address, and wherein the emov instruction is obtained by adding an encoding function of the control data to a function of a mov instruction.

2. The method of encoding and decoding memory data for software security of claim 1, wherein the encoding of the memory data and storing in the memory area includes:

encoding the memory data using a value (Td) of the memory data and an address (Ta) of the memory area in which the memory data is stored.

3. The method of encoding and decoding memory data for software security of claim 1, wherein the encoding of the memory data and storing in the memory area includes:

generating an encryption key for each of a value (Td) of the memory data and an address (Ta) of the memory area in which the memory data is stored by using a mapping table in which each value of the memory data and each address of the memory area in which the memory data is stored are respectively mapped with a random number and stored.

4. The method of encoding and decoding memory data for software security of claim 3, wherein the encoding of the memory data by using the value (Td) of the memory data and the address (Ta) of the memory area in which the memory data is stored includes:

encoding the memory data through an exclusive OR operation between the encryption key of the value (Td) of the memory data and the encryption key of the address (Ta) of the memory area in which the memory data is stored.

5. The method of encoding and decoding memory data for software security of claim 4, wherein the encoding of the memory data and storing in the memory area includes:

obtaining a result of the exclusive OR operation between the encryption key of the value (Td) of the memory data and the encryption key of the address (Ta) of the memory area in which the memory data is stored as an inherent ID for the memory data; and storing the inherent ID in the address (Ta) of the memory area in which the memory data is stored.

6. The method of encoding and decoding memory data for software security of claim 4, wherein the decoding of the encoded memory data in the memory area and branching to an address designated by a value of the memory data includes:

generating a decryption key of the address (Ta) of the memory area in which the memory data is stored by using a mapping table in which each address of the memory area in which the memory data is stored is mapped with a random number and stored;

obtaining an encryption key of the value (Td) of the memory data through an exclusive OR operation between the decryption key of the address (Ta) of the memory area in which the memory data is stored and the encoded memory data; and obtaining the value (Td) of the memory data by decoding the encryption key of the value (Td) of the memory data.

7. The method of encoding and decoding memory data for software security of claim 6, wherein the obtaining of the value (Td) of the memory data by decoding the encryption key of the value (Td) of the memory data includes:

decoding the encryption key of the value (Td) of the memory data by using a reverse mapping table of the mapping table in which each value of the memory data is mapped with a random number and stored.

8. A computer-readable recording medium in which a computer program for executing the method of encoding and decoding memory data of claim 1 is recorded.

9. An apparatus for encoding and decoding memory data for software security, which is included in a computer processor for executing a software to encode and decode memory data stored in a memory area for the software security, the computer processor configured to:

encode, based on a target address of a memory area in which control data is stored by an emov instruction, the memory data using a machine language into which an encoding function is injected and stores the encoded memory data in the memory area; and decode the encoded memory data in the memory area, by an instruction that changes a control flow only in an indirect branch instruction, using a machine language into which a decoding function is injected and branch the decoded memory data to an address designated by a value of the memory data, wherein the target address is a predetermined address, and wherein the emov instruction is obtained by adding an encoding function of the control data to a function of a mov instruction.

10. The apparatus for encoding and decoding memory data for software security of claim 9, wherein the encoder is executed by an instruction having a storing function and an encoding function of the memory data.

11. The apparatus for encoding and decoding memory data for software security of claim 9, wherein the processor comprises:

an encoder configured to encode, based on the target address of the memory area which the control data is stored, the memory data using the machine language into which the encoding function is injected; and a decoder configured to decode the encoded memory data in the memory area using the machine language into which the decoding function is injected.

12. The apparatus for encoding and decoding memory data for software security of claim 11, further comprising a mapping table that includes:

a mapping table in which a value of the memory data is mapped with a random number and stored, a mapping table in which the target address of the memory area in which the memory data is stored is mapped with a random number and stored, and a reverse mapping table of the mapping table in which a value of the memory data is mapped with a random number and stored.

13. The apparatus for encoding and decoding memory data for software security of claim 12, wherein the encoder includes:

an encryption key generator configured to generate an encryption key for each of a value (Td) of the memory data and an address (Ta) of the memory area in which the memory data is stored by using the mapping table;

an encoding calculator configured to encode the memory data through an exclusive OR operation between the encryption key of the value (Td) of the memory data and the encryption key of the address (Ta) of the memory area in which the memory data is stored; and a storage unit configured to obtain a result of the exclusive OR operation between the encryption key of the value (Td) of the memory data and the encryption key of the address (Ta) of the memory area in which the memory data is stored as an inherent ID for the memory data and store the inherent ID in the address (Ta) of the memory area in which the memory data is stored.

14. The apparatus for encoding and decoding memory data for software security of claim 13, wherein the decoder includes:

a decryption key generator configured to generate a decryption key of the address (Ta) of the memory area in which the memory data is stored by using the mapping table;

a decoding calculator configured to obtain the encryption key of the value (Td) of the memory data through an exclusive OR operation between the decryption key of the address (Ta) of the memory area in which the memory data is stored and the encoded memory data and decode the encryption key of the value (Td) of the memory data by using the mapping table; and a caller configured to change the control flow to the value (Td) of the memory data.

\* \* \* \* \*